United States Patent
Chen et al.

(10) Patent No.: US 11,548,552 B2
(45) Date of Patent: Jan. 10, 2023

(54) STEERING DEVICE AND METHOD THEREOF

(71) Applicant: INDUSTRIAL TECHNOLOGY RESEARCH INSTITUTE, Hsin-Chu (TW)

(72) Inventors: Peng-Yu Chen, Toufen (TW); Chia Tsao, New Taipei (TW); Cheng-Han Ho, Tainan (TW); Yu-Chun Hsiao, Yuanlin (TW); Fang-Ming Lee, Taoyuan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 531 days.

(21) Appl. No.: 16/724,601

(22) Filed: Dec. 23, 2019

(65) Prior Publication Data
US 2021/0155290 A1 May 27, 2021

(30) Foreign Application Priority Data
Nov. 22, 2019 (TW) .................................. 108142495

(51) Int. Cl.
*B62D 17/00* (2006.01)
*B60G 3/20* (2006.01)
(Continued)

(52) U.S. Cl.
CPC .............. *B62D 17/00* (2013.01); *B60G 3/20* (2013.01); *B62D 3/02* (2013.01); *B62D 5/0418* (2013.01); *B62D 7/166* (2013.01); *B62D 7/18* (2013.01)

(58) Field of Classification Search
CPC ........ B62D 17/00; B62D 3/02; B62D 5/0418; B62D 7/166; B62D 7/18; B62D 9/04;
(Continued)

(56) References Cited

U.S. PATENT DOCUMENTS 4,700,972 A * 10/1987 Young ................ B60G 17/0195
280/5.521
4,971,348 A 11/1990 Oyama et al.
(Continued)

FOREIGN PATENT DOCUMENTS

CN        1150780 A     5/1997
CN      201390103 Y     1/2010
(Continued)

OTHER PUBLICATIONS

China Patent Office, "Notice of Allowance", dated May 17, 2022, China.
(Continued)

*Primary Examiner* — Darlene P Condra
(74) *Attorney, Agent, or Firm* — Locke Lord LLP; Tim Tingkang Xia, Esq.

(57) ABSTRACT

A steering device includes a steering power unit, a transmission unit, an upper control arm, a steering element, an eccentric bolt and a steering knuckle. The steering power unit has at least one torque-output end. The transmission unit is connected with the torque-output end. The steering element is connected with the transmission unit. The eccentric bolt, installed at the upper control arm, is connected with the steering power unit. The steering knuckle, mounted to a wheel disc, is connected with the steering element and the upper control arm, and used for controlling the wheel disc. The steering power unit drives the steering element to push or pull the steering knuckle for controlling a turning angle, and simultaneously drives the eccentric bolt to have the upper control arm to push or pull the steering knuckle for varying a camber angle of the wheel disc. In addition, a steering method is provided.

16 Claims, 5 Drawing Sheets

(51) Int. Cl.
  *B62D 5/04* (2006.01)
  *B62D 7/16* (2006.01)
  *B62D 3/02* (2006.01)
  *B62D 7/18* (2006.01)

(58) Field of Classification Search
  CPC .......... B62D 5/0445; B62D 7/20; B60G 3/20; B60G 17/0195; B60G 2200/144; B60G 2200/44; B60G 2200/464; B60G 2202/42; B60G 2204/419; B60G 2204/4193
  See application file for complete search history.

(56) References Cited

U.S. PATENT DOCUMENTS

| | | | |
|---|---|---|---|
| 6,283,483 | B1 | 9/2001 | Johnson et al. |
| 6,561,307 | B1 * | 5/2003 | Brill ................... B62D 5/0418 180/443 |
| 6,688,620 | B2 | 2/2004 | Serra et al. |
| 7,914,020 | B2 | 3/2011 | Boston |
| 10,112,649 | B2 * | 10/2018 | Rogers ................ B60G 17/016 |
| 2001/0054801 | A1 | 12/2001 | Perello et al. |
| 2002/0070509 | A1 | 6/2002 | Woo |
| 2007/0096418 | A1 | 5/2007 | Houser et al. |
| 2007/0216125 | A1 | 9/2007 | Baxter |
| 2009/0194965 | A1 | 8/2009 | Boston |
| 2010/0044979 | A1 | 2/2010 | Haeusler et al. |
| 2018/0201319 | A1 * | 7/2018 | Rogers ................... B60G 3/26 |
| 2019/0161115 | A1 | 5/2019 | Yamazaki et al. |

FOREIGN PATENT DOCUMENTS

| | | | |
|---|---|---|---|
| CN | 102164804 | A | 8/2011 |
| CN | 101687455 | B | 4/2012 |
| CN | 102083642 | B | 5/2013 |
| CN | 103476607 | A | 12/2013 |
| CN | 106218334 | A * | 12/2016 |
| CN | 106240628 | A | 12/2016 |
| CN | 106660583 | A | 5/2017 |
| CN | 107284520 | A | 10/2017 |
| CN | 108216367 | A | 6/2018 |
| CN | 108382470 | A * | 8/2018 ............. B62D 21/02 |
| CN | 109050194 | A | 12/2018 |
| CN | 110053440 | A | 7/2019 |
| CN | 110461629 | A | 11/2019 |
| DE | 102015001864 | A1 | 8/2016 |
| DE | 102017211672 | A1 | 1/2019 |
| EP | 2253489 | A2 | 11/2010 |
| FR | 2675432 | A1 * | 10/1992 ........... B60G 11/181 |
| JP | H06127244 | A | 5/1994 |
| JP | H07257423 | A | 10/1995 |
| JP | 2006347399 | A | 12/2006 |
| JP | 2008238898 | A | 10/2008 |
| KR | 20040048120 | A | 6/2004 |
| TW | 299396 | B | 3/1997 |
| TW | 494225 | B | 7/2002 |
| TW | I268887 | B | 12/2006 |
| TW | I274677 | B | 3/2007 |
| TW | 201036855 | A | 10/2010 |
| TW | M517114 | U | 2/2016 |
| WO | WO-2008128421 | A1 * | 10/2008 ............. B62D 5/001 |
| WO | 2010113694 | A1 | 10/2010 |

OTHER PUBLICATIONS

Zhang, Jun et al., Research on the Motion of Steering Wheel Camber Angle, Machinery Design & Manufacture, No. 2, 2016.
Taiwan Patent Office, Office Action, dated Mar. 22, 2022, Taiwan.
Taiwan Patent Office, 108142495, "Office Action", dated Nov. 27, 2020, Taiwan.
China Patent Office, "Office Action", dated Oct. 28, 2021, China.
Yoshimi Furukawa et al., A Review of Four-Wheel Steering Studies from the Viewpoint of Vehicle Dynamics and Control, Vehicle System Dynamics, 18(1989), 151-186.
A.G. Nalecz e al., Analysis of the Dynamics Response of Four Wheel Steering Vehicles at High Speed, International Journal of Vehicle Design, 1988, vol. 9, No. 2.
Balázs Németh et al., Enhancement of Vehicle Stability Based on Variable Geometry Suspension and Robust LPV Control, IEEE/ASME International Conference on Advanced Intelligent Mechatronics, 2011.
F. Braghhin, Potentialities of Active Suspensions for the Improvement of Handling Performances, Proceddings of the ASME 2010 10th Biennial Conference on Engineering Systems Design and Analysis, 2010.
S. Sano et al., Four Wheel Steering System with Rear Wheel Steer Angle Controlled as a Function of Steering Wheel Angle, SAE International Congress and Exposition, 1986.
H. B. Pacejka, Tyre and vehicle dynamics, Professor Emeritus, Delft University of Technology, Consultant TNO Automotive Delft, Netherlands, 2006.

* cited by examiner

STEERING DEVICE AND METHOD THEREOF

CROSS REFERENCE TO RELATED APPLICATION

This application claims the benefits of Taiwan application Serial No. 108142495, filed on Nov. 22, 2019, the disclosures of which are incorporated by references herein in its entirety.

TECHNICAL FIELD

The present disclosure relates in general to a steering device and a method thereof, and more particularly to a steering device and a method of the steering device that can control integrally and simultaneously the turning angle and the camber angle, so that the required turning radius of vehicle can be effectively reduced, and also the steering performance of vehicle can be much improved.

BACKGROUND

While a vehicle turns, a turning angle of vehicle is usually manipulated. Through a steering wheel and a steering booster to drive a pitman arm to further push a rod relay, then a steering knuckle would vary the turning angle, and thereby vehicle wheels would generate a corresponding side-slip angle to have the vehicle to pass the turn. However, if the turning angle is not sufficient to make a desired turn, the vehicle may slip out of the road. On the other hand, if the turning angle is too much, then the vehicle may slip laterally to drift.

Since a camber angle of vehicle can be used for enhancing vehicle's cornering performance and reducing wheel wear, thus in order to compensate possible defects in vehicle's steering, the camber angle is usually modulated to match the steering force so as to improve skills for turning the vehicle.

Currently, most of the conventional steering mechanisms and devices usually apply relevant actuators, and typically each wheel of vehicle is usually furnished with at least two actuators respective for controlling the turning angle and the camber angle. In addition, the conventional actuator for the current steering mechanism and device is usually too large in size, from which space, cost and energy are substantially sacrificed. Further, with different actuators to drive the turning angle and the camber angle, respectively, a larger turning radius would be needed while the vehicle turns.

In view of related conventional technology, topics for improving defects of a steering control mechanism applied to a four-wheel vehicle, reducing the number of necessary components, and minimizing the space occupied by the actuator or the steering mechanism, so as to reduce the turning radius of vehicle, are some of many targets that this disclosure intends to solve simultaneously.

Through various experiments and simulations, this disclosure proposes a steering mechanism that can integrate controls upon the turning angle and the camber angle simultaneously. According to this disclosure, each of the wheels utilizes a power component to pull or push the steering member with less loading so as to control it to turn. Thereupon, the actuator for the steering mechanism does not need to be one with larger specs. Since the power component of this disclosure can adjust the camber angle to correct the turning angle in a real-time manner, thus the vehicle equipped with the steering mechanism of this disclosure can be stably turned, and the corresponding turning radius can be reduced.

SUMMARY

In this disclosure, a steering device and a method thereof are provided. The steering device includes: a steering power unit, having at least one torque-output end; a transmission unit, including a transmission member and a screw bar unit, the transmission member being connected with the torque-output end, the screw bar unit being driven via the transmission member; a steering element, connected with the screw bar unit, used for controlling a turning angle of vehicle; an upper control arm; a steering knuckle, mounted to a wheel disc, connected with the upper control arm and the steering element; an eccentric bolt, installed at the upper control arm; a screw bar unit, having a transmission member and a gear, the transmission member being driven by the torque-output end to rotate the gear and further to move the upper control arm and the steering knuckle for adjusting a camber angle.

In this disclosure, the steering device is installed to vehicle's chassis via a lower control arm and a suspension shock absorber.

The steering power unit, electrically connected with a human-machine interface controller, receives a steering signal for activation via the human-machine interface controller. The steering power unit outputs a torque/rotational speed to have the transmission unit to drive the steering element for pushing or pulling the steering knuckle. The steering knuckle can then move together with the wheel disc so as to vary the turning angle thereof. Simultaneously, the steering power unit outputs the torque/rotational speed to rotate the eccentric bolt via the screw bar unit, such that positions of the upper control arm and the steering knuckle can be varied by altering a geometrical suspension relationship so as to adjust the camber angle.

In this disclosure, the torque-output end of the steering power unit utilizes the screw bar unit to transform the rotational motion into the corresponding linear motion.

In this disclosure, the steering power unit is a motor, the steering element is a tie rod, and the transmission member is one of a chain, a belt and a gear rack for speed modulation.

In this disclosure, the steering method for the aforesaid steering device includes the steps of: (1) a steering power unit being applied to receive a steering signal issued by a human-machine interface controller; (2) the steering power unit being activated, upon when the steering signal is received; (3) the steering power unit outputting a torque/rotational speed to drive a transmission unit and further a steering element; (4) the steering element operating a steering knuckle to control a wheel disc to vary a turning angle of a wheel, the steering knuckle being mounted to the wheel disc and connected with an upper control arm and the steering element; and (5) the steering power unit outputting simultaneously the torque/rotational speed to rotate an eccentric bolt connected with the upper control arm, through the eccentric bolt to move together the steering knuckle so as to vary the camber angle of the wheel disc.

As stated above, in the steering device and the steering method provided by this disclosure, upon when the steering signal is received, controls of vehicle's turning angle and camber angle can be simultaneously integrated. Thereupon, with the same steering force to pass a curve, the side-slip angle can be reduced. Thus, vehicle's cornering performance can be improved, component number can be reduced, tire's side-slip angle can be lowered, and tire wear can be reduced as well.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given hereinbelow and the accompanying drawings which are given by way of illustration only, and thus are not limitative of the present disclosure and wherein.

DETAILED DESCRIPTION

Figure 1:
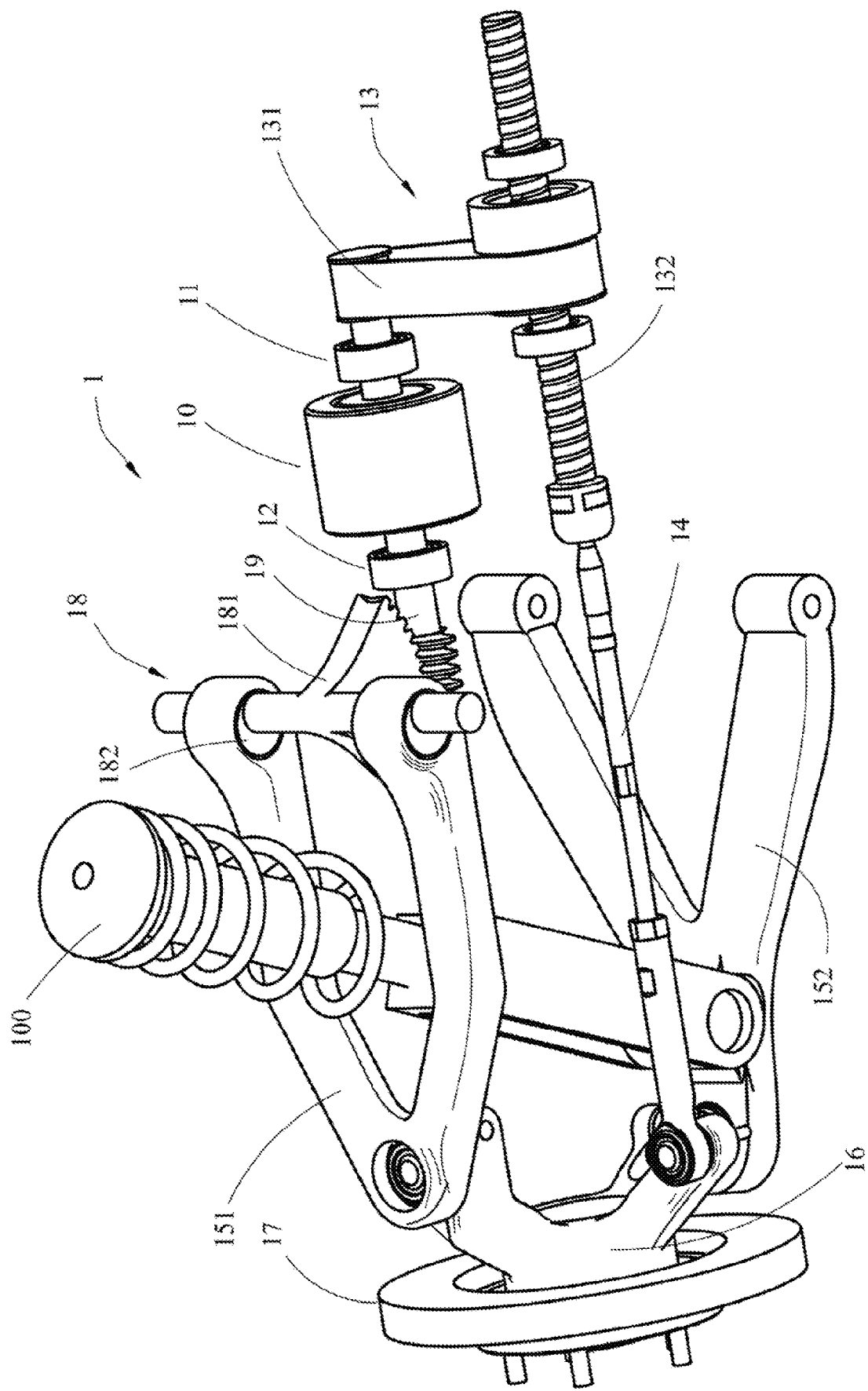
FIG. 1 is a schematic perspective view of an embodiment of the steering device in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a schematic perspective view of an embodiment of the steering device in accordance with this disclosure is shown. The steering device 1 includes a steering power unit 10 having a first torque-output end 11 and a second torque-output end 12 disposed to two opposite ends thereof, a transmission unit 13 having a transmission member 131 connected with the first torque-output end 11 and a screw bar unit 132 driven by the transmission member 131, a steering element 14 connected with the screw bar unit 132, an upper control arm 151, a steering knuckle 16 connected with a wheel disc 17 at one end thereof and the steering element 14 at another end thereof so as to control a turning angle of the wheel disc 17, an eccentric bolt 18 installed at the upper control arm 151 and having a power-transmitting member 181 and a cam 182, a power-driving screw 19 connected with the second torque-output end 12 at one end thereof and engaged with the power-transmitting member 181 so as to rotate the cam 182 with respect to the upper control arm 151 and thus drive the steering knuckle 16 to adjust the camber angle.

In this embodiment, the steering device 1 is mounted to vehicle's chassis (not shown in the figure) via a suspension shock absorber 100 and the lower control arm 152.

In this embodiment, the steering power unit 10, electrically connected with a human-machine interface controller (not shown in the figure), is activated after a steering signal is received by the human-machine interface controller. The first torque-output end 11 of the steering power unit 10 provides a torque/rotational speed to drive the transmission unit 13 and further the steering element 14 to push or pull the steering knuckle 16, and then the steering knuckle 16 connected with the wheel disc 17 can vary the turning angle of the wheel disc 17.

On the other hand, the steering power unit 10 supplies simultaneously the torque/rotational speed, via the second torque-output end 12, to rotate the eccentric bolt 18, such that positioning of the upper control arm 151 as well as the steering knuckle 16 can be varied. Thereupon, geometrical relationship of the entire suspension system having the steering power unit 10 would be varied for adjusting the camber angle.

Since the steering element 14 and the eccentric bolt 18 are synchronously driven by the same steering power unit 10, thus, after the eccentric bolt 18 reaches a critical point, the steering element 14 would push or pull correspondingly the steering knuckle 16. According to this disclosure, the eccentric bolt 18 and the steering element 14 are related in a predetermined proportional relationship.

In this embodiment, the power-transmitting member 181 is formed as a gear. Through the power-transmitting member 181, a power of the steering power unit 10 is transmitted to the power-driving screw 19 via the second torque-output end 12, such that the rotational motion output from the steering power unit 10 can be transformed into the corresponding linear motion at the power-driving screw 19.

In this embodiment, the steering power unit 10 is a motor, and the steering element 14 is a tie rod.

In this embodiment, the transmission member 131 can be a chain, a belt or a gear rack for velocity modulation.

Figure 2:
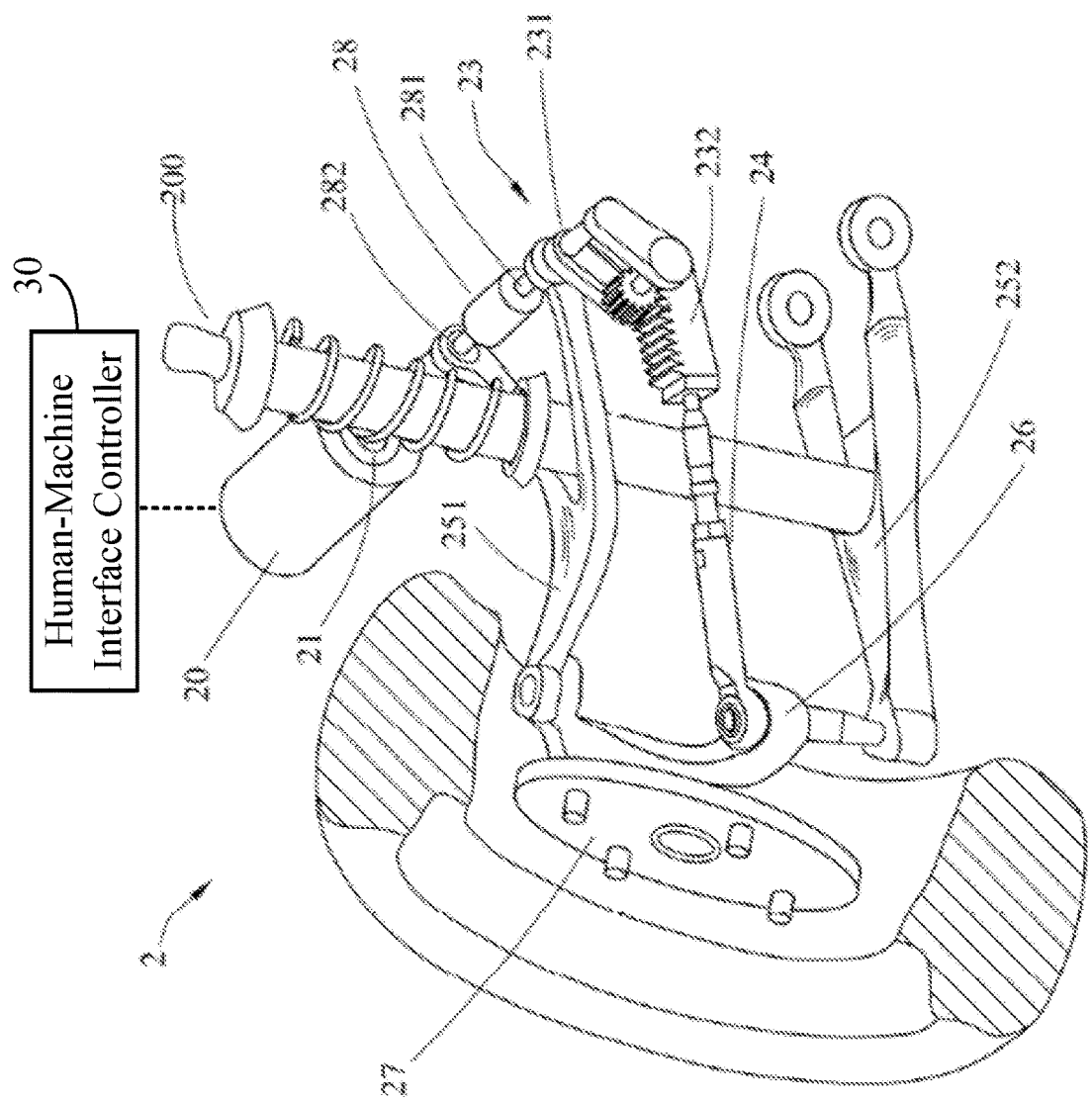
FIG. 2 is a schematic perspective view of another embodiment of the steering device in accordance with this disclosure.

Referring now to FIG. 2, a schematic perspective view of another embodiment of the steering device in accordance with this disclosure is shown. The steering device 2 includes a steering power unit 20 having a torque-output end 21, a transmission unit 23 having a transmission member 231 connected with the torque-output end 21 and a gear rack unit 232 driven by the transmission member 231, a steering element 24 connected with the gear rack unit 232, an upper control arm 251, a steering knuckle 26 mounted to a wheel disc 27 and having one end thereof connected with the steering element 24 and another end thereof connected with the upper control arm 251 so as to control a turning angle of the wheel disc 27, and an eccentric bolt 28 installed at the upper control arm 251 and having a transmission shaft 281 and a cam 282, in which the transmission shaft 281 connected with the torque-output end 21 of the steering power unit 20 can rotate the cam 282 to move the upper control arm 251, and further to displace the steering knuckle 26 so as to adjust the camber angle.

In this embodiment, the steering device 2 is mounted to vehicle's chassis (not shown in the figure) via a suspension shock absorber 200 and the lower control arm 252.

In this embodiment, the steering power unit 20, electrically connected with a human-machine interface controller 30 (as shown in FIG. 2), is activated after a steering signal is received by the human-machine interface controller 30. The torque-output end 21 of the steering power unit 20 provides a torque/rotational speed to drive the transmission unit 23 and further the steering element 24 to push or pull the steering knuckle 26, and then the steering knuckle 26 connected with the wheel disc 27 can vary the turning angle of the wheel disc 27 accordingly.

In this embodiment, when the steering power unit 20 is activated upon receiving a steering signal via the human-machine interface controller 30, the steering power unit 20 would the drive the steering element 24 to push or pull the steering knuckle 26, and further the wheel disc 27 is moved together with the steering knuckle 26, so that the turning angle of the wheel disc 27 can be changed.

In this embodiment, the steering power unit 20 simultaneously drives the cam 282 at the eccentric bolt 28 to displace both the upper control arm 251 and the steering knuckle 26, such that the camber angle of the wheel disc 27 can be also varied.

In this embodiment, since the steering element 24 and the eccentric bolt 28 are synchronously activated, thus as soon as the eccentric bolt 28 is moved to reach a critical point, the steering element 24 would then push or pull the steering knuckle 26 accordingly. The eccentric bolt 28 and the steering element 24 are defined with a specific proportional relationship. The critical point is related to a tire pattern. With different tire patterns, the critical point may not be the same.

In this embodiment, the torque-output end 21 connecting the steering power unit 20 to the eccentric bolt 23 can be a transmission belt.

In this embodiment, the steering power unit 20 can be a motor, and the steering element 24 can be a tie rod.

In this embodiment, the transmission member 231 can be a chain, a belt or a gear rack for motion modulation.

Figure 3:
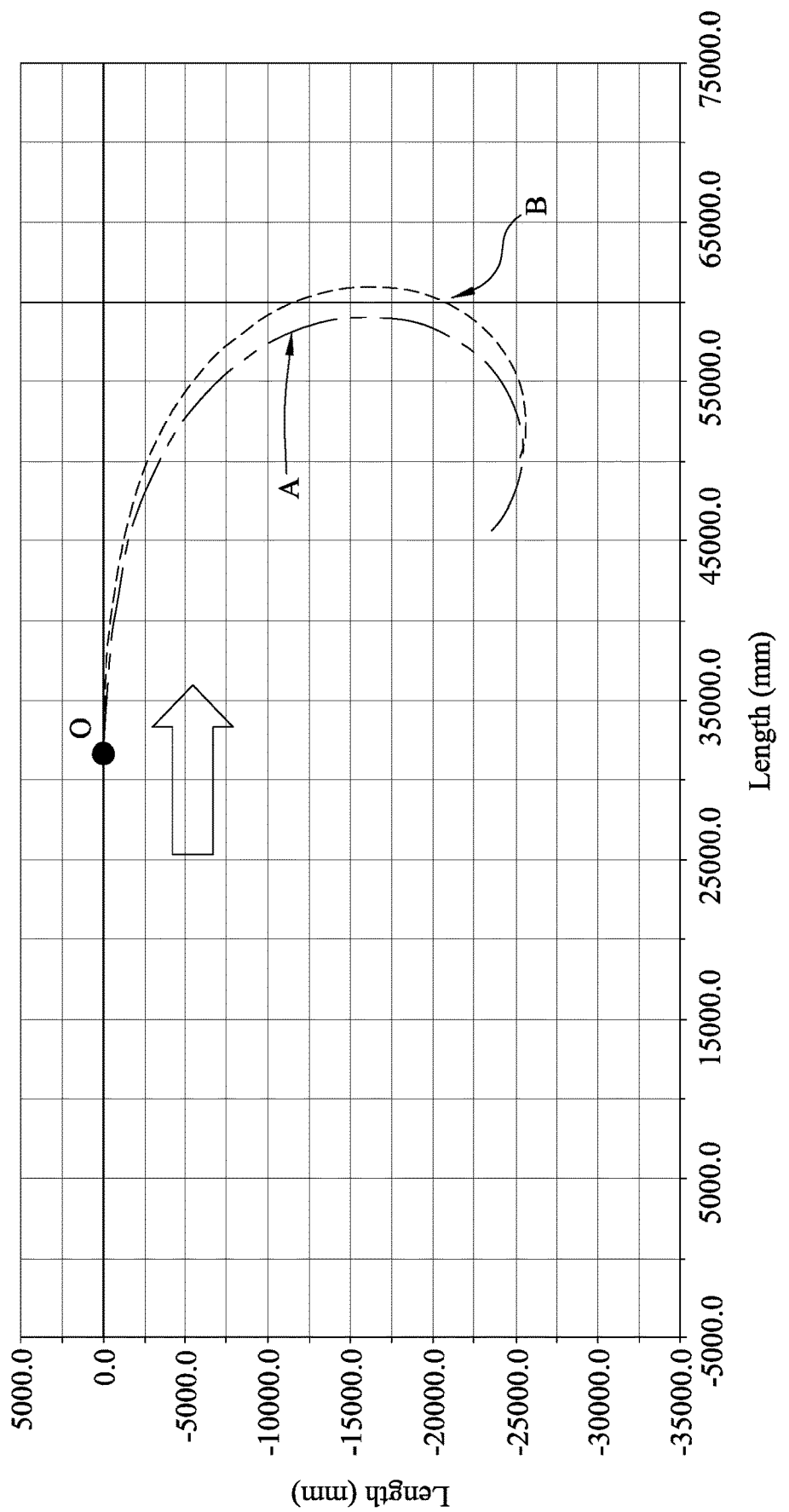
FIG. 3 is a plot of experimental data showing how the camber angle can increase the steering force in accordance with this disclosure.

Referring now to FIG. 3, results from vehicle turning simulations upon the aforesaid steering arrangement are demonstrated. In these simulation, the vehicle weight is set to 2,200 kg, the axle distance is set to 3,000 mm, the vehicle width is set to 1,900 mm, the wheel spec is 205/55 R16, and the vehicle steering simulation is a simulation of step steering.

In FIG. 3, Point O is the roll-in point, and the arrow indicates the driving direction. At the roll-in point O, all the four wheels are simulated with 10 degrees of turning angle, and both the rear wheels are simulated with 5 degrees of camber angle. Curve A stands for the variation of turning radius for the front-and-rear wheel steering adjusted by the assigned rear-wheel camber angle, and Curve B stands for the variation of turning radius for the front-and-rear wheel steering without any adjustment. It is obvious that the turning radius of Curve A is smaller than the corresponding turning radius of Curve B.

Figure 4:
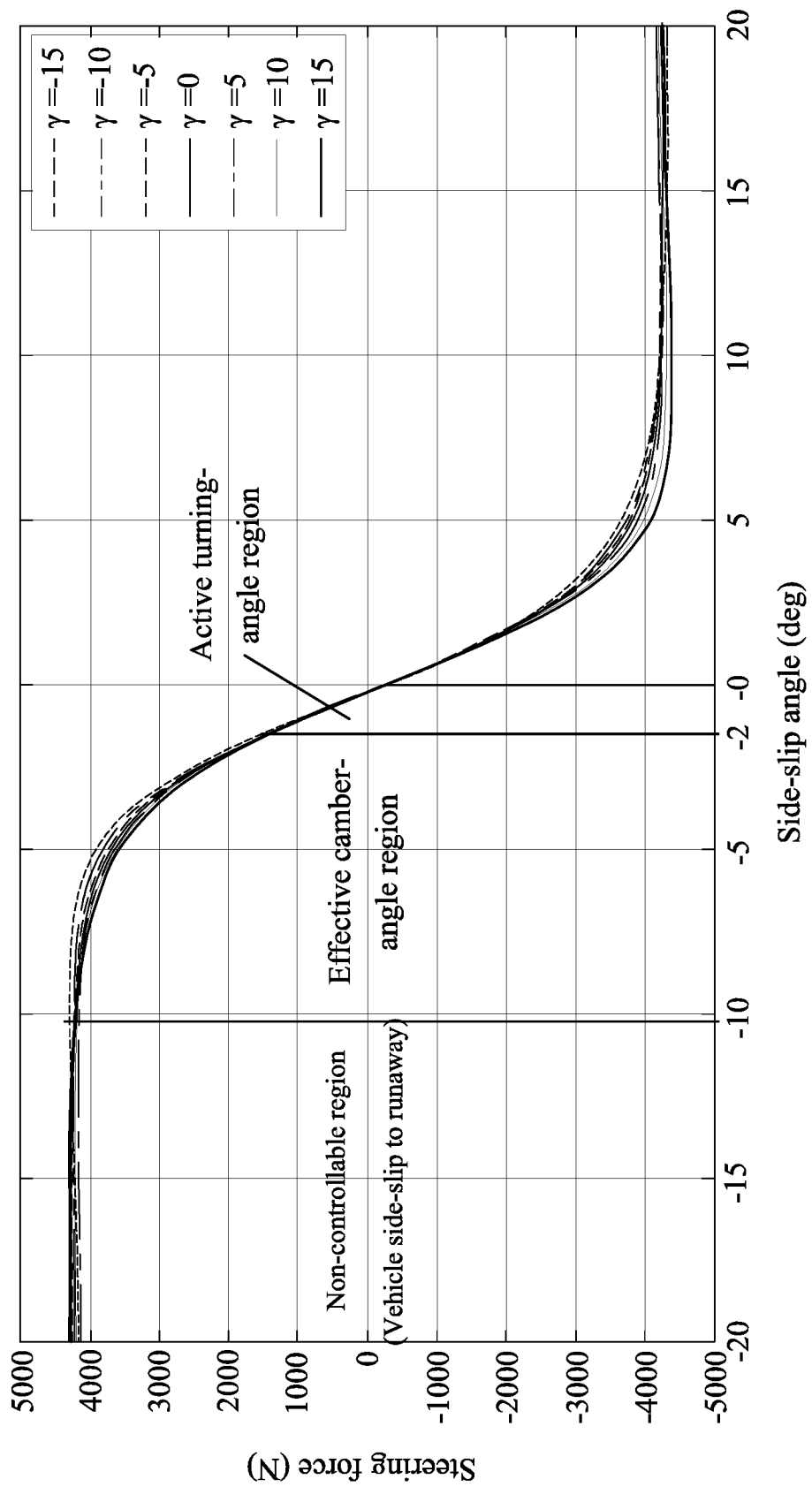
FIG. 4 demonstrates schematically relationships between the steering force and the side-slip angle in accordance with this disclosure.

Based on experimental data, FIG. 4 demonstrates schematically relationships between the steering force and the side-slip angle for the steering mechanism in accordance with this disclosure, from which a reference ratio of the turning angle to the camber angle (turning angle/camber angle) for the control of the steering mechanism of this disclosure can be decided. In FIG. 4, the horizontal axis stands for the side-slip angle, the vertical axis stands for the turning force, and γ stands for the camber angle, in which a positive or negative value of the side-slip angle is determined by the direction thereof. From curves in the figure, it is observed that, at any of different camber angles, the turning force increases as the side-slip angle decreases for the side-slip angle around zero. For the range of side-slip angle having an absolute value less than 2 degree, it is proved by experimental data that the camber angle does not have an observable effect upon the steering force. However, while the absolute value of the side-slip angle greater than 2 degrees, the effect of the camber angle upon the steering force becomes significant. Further, for the absolute value of the side-slip angle greater than 10 degrees, no more additional steering force can be provided.

Further, from FIG. 4, it is known that, while in low side-slip angles, low camber angle shall be utilized for control, so that better riding comfort can be provided. On the other hand, while in large side-slip angles, high camber angle shall be utilized, from which more steering force can be provided at the same side-slip angle.

Figure 5:
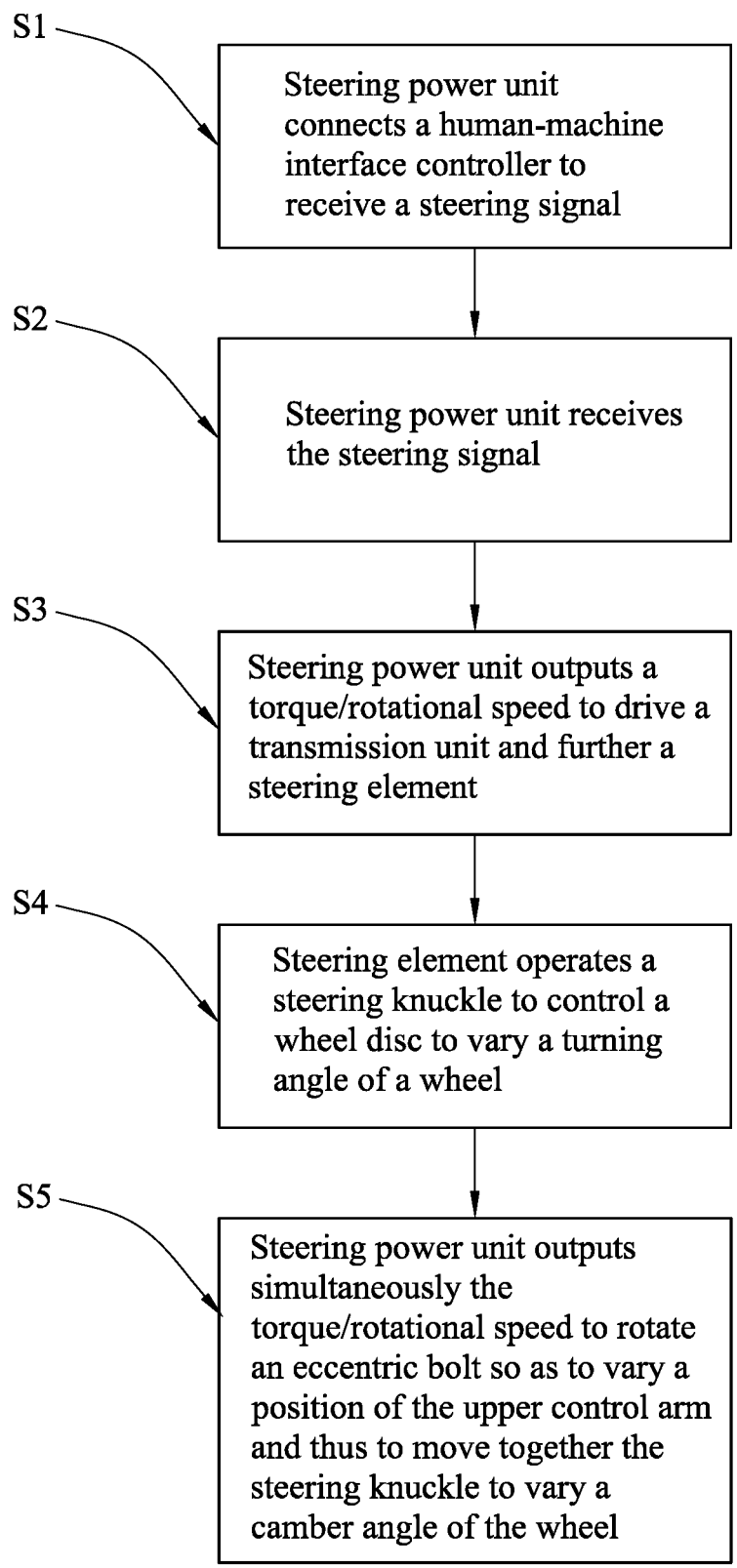
FIG. 5 is a flowchart of an embodiment of the steering method in accordance with this disclosure.

Referring now to FIG. 5, a flowchart of an embodiment of the steering method integrating both the turning-angle control and the camber-angle control for the steering mechanism in accordance with this disclosure is schematically shown. The integrated steering method of this disclosure includes the following steps; i.e., Steps S1~S5. Step S1: A steering power unit is applied to receive a steering signal issued by a human-machine interface controller. Step S2: The steering power unit is activated, upon when the steering signal is received. Step S3: The steering power unit outputs a torque/rotational speed to drive a transmission unit and further a steering element. Step S4: The steering element operates a steering knuckle to control a wheel disc to vary a turning angle of a wheel. Step S5: The steering power unit outputs simultaneously a torque/rotational speed to rotate an eccentric bolt connected with an upper control arm so as to vary a position of the upper control arm and thus to move together the steering knuckle, such that a geometrical suspension relationship would vary to alter a camber angle of the wheel disc.

In Step S1 of this embodiment, the human-machine interface controller is electrically connected with the steering power unit, and the steering power unit is a motor.

In Step S3 of this embodiment, the transmission unit further includes a transmission member and a screw bar unit. The transmission unit drives the steering element via the screw bar unit. The transmission member can be a chain, a belt or a gear rack having a function of speed modulation, and the steering element is a tie rod.

In Step S4 of this embodiment, the steering knuckle, mounted to the wheel disc, is connected with the upper control arm and the steering element.

In Step S5 of this embodiment, between the steering power unit and the eccentric bolt, the torque/rotational speed is outputted to drive the eccentric bolt via a a screw gear set or a belt.

In the steering method provided by this disclosure, the steering element and the eccentric bolt are synchronously activated. When the eccentric bolt reaches a critical point, the steering element is activated to push or pull the steering knuckle. In particular, the steering element and the steering knuckle are defined with a proportional relationship. This relationship is already presented by FIG. 4 and some foregoing description, and thus detail thereabout would be omitted herein.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A steering device, comprising:
   a steering power unit, having at least one torque-output end, wherein the at least one torque-output end includes a first torque-output end and a second torque-output end;
   a transmission unit, connected with the torque-output end;
   an upper control arm;
   a steering element, connected with the transmission unit;
   an eccentric bolt, installed at the upper control arm, connected with the steering power unit;
   a steering knuckle, mounted to a wheel disc, connected with the steering element and the upper control arm, used for controlling the wheel disc;
   wherein the steering power unit is electrically connected with a human-machine interface controller, and the steering power unit receives a steering signal via the human-machine interface controller;
   wherein the steering power unit drives the steering element to push or pull the steering knuckle for controlling a turning angle;
   wherein the steering power unit simultaneously drives the eccentric bolt to have the upper control arm to push or pull the steering knuckle for varying a camber angle of the wheel disc.

2. The steering device of claim 1, wherein the transmission unit further includes a transmission member and a screw bar unit, the transmission member is connected with the first torque-output end of the steering power unit, and the screw bar unit drives the steering element.

3. The steering device of claim 2, wherein the eccentric bolt further includes a power-transmitting member and a cam, the power-transmitting member is a gear to transform rotational motion of the torque-output end into linear motion.

4. The steering device of claim 3, further including a power-driving screw, connected with the second torque-output end and the power-transmitting member, used for rotating the cam to move the upper control arm and the steering knuckle for adjusting the camber angle.

5. The steering device of claim 2, wherein the transmission member is one of a chain, a belt and a gear rack for speed modulation.

6. The steering device of claim 1, wherein the transmission unit includes a transmission member and a gear rack unit, the transmission member is connected with the torque-output end, the transmission member drives the gear rack unit, and the gear rack unit is connected with the steering element.

7. The steering device of claim 6, wherein the eccentric bolt includes a transmission shaft and a cam, the transmission shaft, connected with the torque-output end, rotates the cam to move the upper control arm and the steering knuckle for adjusting the camber angle.

8. The steering device of claim 7, wherein the torque-output end of the steering power unit drives the eccentric bolt via a belt.

9. The steering device of claim 6, wherein the transmission member is one of a chain, a belt and a gear rack for speed modulation.

10. The steering device of claim 1, wherein the steering power unit is a motor, and the steering element is a tie rod.

11. A steering method, comprising the steps of:
    (1) applying a steering power unit to receive a steering signal issued by a human-machine interface controller;
    (2) activating the steering power unit, upon when the steering signal is received;
    (3) outputting a torque/rotational speed by the steering power unit to drive a transmission unit and further a steering element;
    (4) operating a steering knuckle by the steering element to control a wheel disc to vary a turning angle of a wheel, the steering knuckle being mounted to the wheel disc and connected with an upper control arm and the steering element; and
    (5) outputting simultaneously the torque/rotational speed by the steering power unit to rotate an eccentric bolt connected with the upper control arm, through the eccentric bolt to move together the steering knuckle so as to vary the camber angle of the wheel disc;
    wherein the eccentric bolt of the step (5) and the steering element of the step (3) are synchronously activated;
    wherein when the eccentric bolt reaches a critical point, the steering element is activated to push or pull the steering knuckle;
    wherein the eccentric bolt and the steering element are defined with a proportional relationship.

12. The steering method of claim 11, wherein the human-machine interface controller of the step (1) is electrically connected with the steering power unit.

13. The steering method of claim 11, wherein the steering power unit is a motor.

14. The steering method of claim 11, wherein the transmission unit of the step (3) further includes a transmission member and a screw bar unit, the transmission unit drives the steering element via the screw bar unit, and the steering element is a tie rod.

15. The steering method of claim 14, wherein the transmission member is one of a chain, a belt and a gear rack for speed modulation.

16. The steering method of claim 13, wherein the steering knuckle of the step (4) is mounted to the wheel disc, and connected with the upper control arm and the steering element.

* * * * *